United States Patent [19]
Berger et al.

[11] Patent Number: 5,671,935
[45] Date of Patent: Sep. 30, 1997

[54] AIR BAG AND MANUFACTURING METHOD THEREFOR

[75] Inventors: Johann Berger, Obere Schlossstrasse 114, D-73553 Alfdorf; Artur Foehl, Schorndorf, both of Germany

[73] Assignee: Johann Berger, Alfdorf, Germany

[21] Appl. No.: 500,859

[22] PCT Filed: Jan. 27, 1994

[86] PCT No.: PCT/EP94/00222

§ 371 Date: Oct. 5, 1995

§ 102(e) Date: Oct. 5, 1995

[87] PCT Pub. No.: WO94/18033

PCT Pub. Date: Aug. 18, 1994

[30] Foreign Application Priority Data

Feb. 2, 1993 [DE] Germany .................. 43 029 04.3
Dec. 21, 1993 [DE] Germany .................. 43 43 738.9

[51] Int. Cl.[6] .................................................. B60R 21/16
[52] U.S. Cl. ............................................. 280/243.1
[58] Field of Search ......................... 280/743.1, 732

[56] References Cited

U.S. PATENT DOCUMENTS

| | | |
|---|---|---|
| 4,159,613 | 7/1979 | Barnett ........................ 280/732 |
| 4,988,118 | 1/1991 | Good et al. .................. 280/743.1 |
| 5,131,434 | 7/1992 | Krummheuer et al. ...... 280/743.1 |

*Primary Examiner*—Kenneth R. Rice
*Attorney, Agent, or Firm*—Banner & Witcoff, Ltd.

[57] ABSTRACT

An air bag is described which can be made of a single blank (50) of textile material or plastic sheet. The blank can be composed of several parts, but is preferably in one piece. Parts of the blank can be folded along fold pleats (52a,-i) in mutually parallel planes closely adjacent to each other. The folding pleats pass completely across the blank. Two sections (54) of the blank have mirror-image shapes along one folding pleat. After folding in superimposed planes, the edges which are to be joined lie over one another, and can therefore be easily sewn up. If the inner folding pleats (52i) and outer folding pleats (52a) alternate in the blank, the blank can be folded into a shape in the manner of a closed umbrella, the inner fold pleats (52i) corresponding to the ribs of the umbrella, and the sections (54) connected by the outer fold pleats (52a) projecting outwards. Two sections (54) adjoining an outer folding pleat (52a) are placed on one another, and their free edges (56) are joined to one another, in particular by sewing. By using a special sewing device, all of the edges to be sewn can be sewn simultaneously.

15 Claims, 7 Drawing Sheets

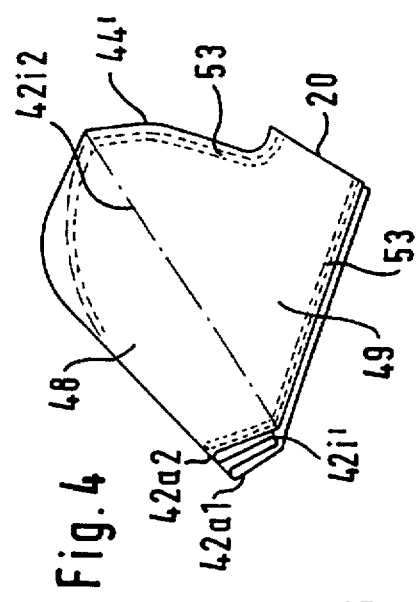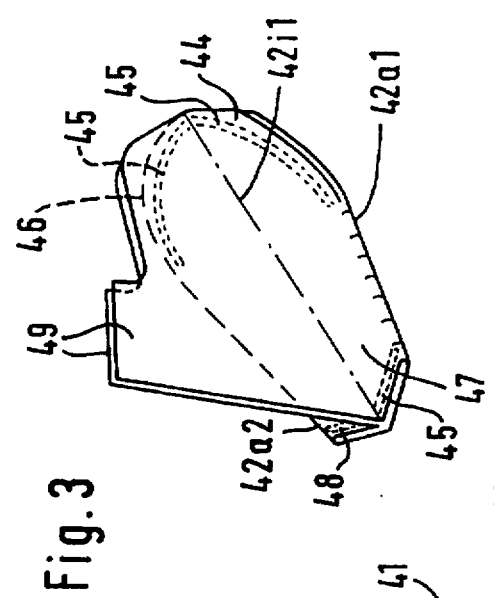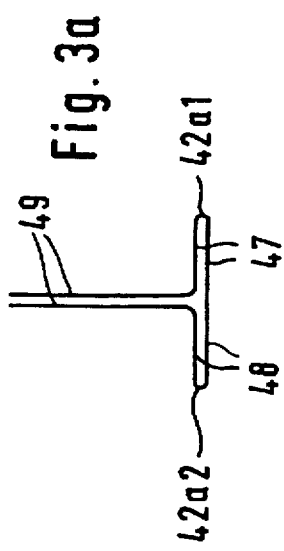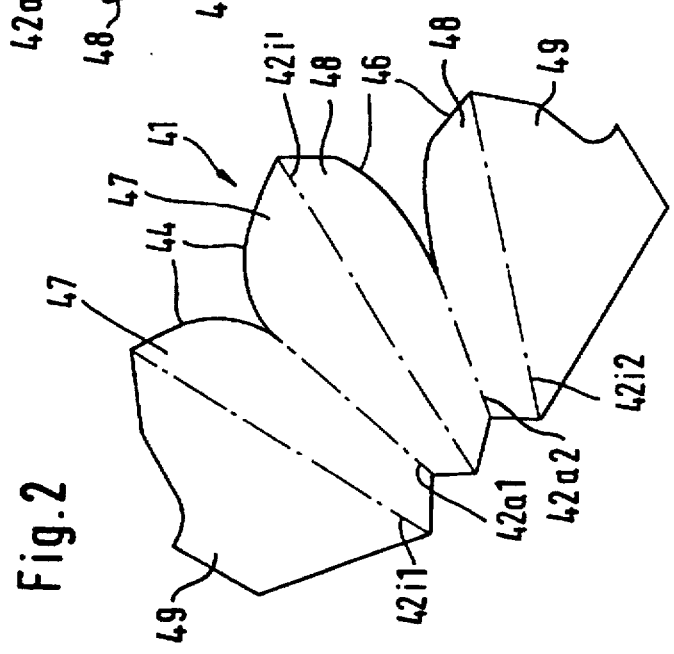

AIR BAG AND MANUFACTURING METHOD THEREFOR

The invention relates to an air bag of differing shapes which is manufactured by cutting out a piece of material, the "cutting", from a web of textile material or plastics film and by then joining the edges thereof to each other. "Joining" in this sense is primarily to be understood as a stitching procedure, where textile material is involved. In the case of a plastics film and also in the case of textile material, bonding and fusing procedures may be employed. The discussion of the FIGS. mainly relates to textile material and stitching procedures, without however the invention being restricted thereto.

The intention of the invention is to permit production of air bags having greater depth, particularly cubic or pear-shaped air bags, as are needed on the front passenger's side. Such air bags are known to be produced by stitching together a front and a rear material section to a jacket section on all sides. From DE,A,24 39 222 (Ballonfabrik), FIGS. 4 and 5 thereof, it is further known for producing a roughly pear-shaped air bag to use a relatively large cutout on all sides having single tags protruding outwards, which are stitched to each other. To avoid an accumulation of seams or bonded joints on the bordering of the tags, the tips thereof need to be cut out in the shape of an arc and then joined on both sides with a separate circularly-shaped cover sheet. Accordingly, in this case three items of fabric are required to produce the air bag.

From the document U.S. Pat. No. 4,169,613 (Barnett) it is known in the production of an air bag to fold a cutting about folding edges into parallel planes in close juxtaposition, the folding edges fully covering the width of the cutting. In this arrangement two sections each of the cutting are mirror-inverse to an outer folding edge and have, after being folded in planes located one above the other, edges to be joined to each other, located one above the other. Inner folding edges and outer folding edges alternate. According to Barnett air bags can be produced which have a consistent cross-section over their length, as may be used especially on the driver's side.

The object of the present invention is to create an air bag having any desired shape, particularly also deepness and necessitating as few joining, particularly stitching procedures as possible.

The stated object is achievable in two variants according to claims 1 or 2. In both variants juxtaposed folding edges include acute angles to each other, as a result of which the sections may be folded so that a kind of umbrella configuration is produced, the outer edges of which permit facilitated joining, particularly stitching. When inflated an air bag results of substantial size. The shape of the air bag may be very greatly varied by suitably selecting sections of differing shape and size. Whilst the cutting is preferably a single piece, it could also be stitched together from e.g. two sections, which especially in the case of highly complicated shapes may be expedient.

From DE 25 25 440 A (Nissan) it is known, in the case of a square cutting, to provide three folded edges in the corners thereof, of which the one runs diagonal, the other two parallel to the side edges; here, in forming the air bag two such cuttings are required, along with a relatively complicated folding procedure, whilst according to the present invention a single, particularly one-pice cutting is sufficient, and the folding procedures are very simple.

FURTHER EMBODIMENTS OF THE INVENTION

The cutting may have essentially the shape of a square or a rectangle, whereby the side edges of the square or rectangle may be recessed to form a cavity of greater depth.

The invention relates further to a method of producing an air bag having more than two of the aforementioned sections. The cutting is folded into a configuration similar to that of a closed umbrella (sunshade), termed simply "umbrella" in the following. In this umbrella the ribs of the umbrella correspond to the inner folding edges, whilst the outer folding edges can be imagined to be those of the outer edges of the fabric parts of the umbrella, protruding outwards between two ribs. For stitching, two sections on both sides of an outer folding edge are placed flat on each other. The free edges of these two sections, corresponding to the fabric edge of the umbrella, are then stitched to each other in a single plane, i.e. in each case for the two sections juxtaposing an outer folding edge, followed by the two sections juxtaposing the next outer folding edge, and so on. It is also possible that four sections are placed simultaneously in a single plane, namely the sections belonging to two juxtaposed outer folding edges. It is thus possible to stitch four sections to each other in a single plane. When robotic means are used for stitching, all sections may be stitched to each other simultaneously.

The web from which the cuttings are to be cut out for the air bag may have holes for the gas outlet by known means, but preferably gas-permeable zones, namely zones comprising material being more permable to gas than the remainder of the web. This principle is known from DE,A,41 26 709 (Akzo). In this arrangement the zones may be located in the web so that they are positioned outside of the area to be faced to the vehicle occupant ("impact surface") in the completed air bag, the gas emergence then not being a nuisance to the occupant. According to yet a further embodiment of the present invention the gas-permeable zones may be strips running in the longitudinal or transverse direction of the web.

Particularly advantageous is an arrangement in which the web has minor gas-permeable zones in its longitudinal direction, of which more than one, e.g. four or five have room in the surface of a cutting in the longitudinal direction of the web. Should a flaw be detected in the web, particularly a weaving flaw, it is sufficient, as compared to the last flawless cutting surface, to displace the next only as much as is just necessary, i.e. so that the desired number of gas-permeable zones have room in a cutting surface.

Example embodiments incorporating further features of the invention will now be described in the following with reference to the drawing in which:

FIG. 1 is a perspective view of a voluminous, asymmetrically pear-shaped air bag;

FIG. 2 is a perspective view of the associated cutting;

FIG. 3 is a perspective view of the folded cutting;

FIG. 3a is a front view of the cutting folded according to FIG. 3;

FIG. 4 is a perspective view of the cutting folded in another way;

Figure 5:
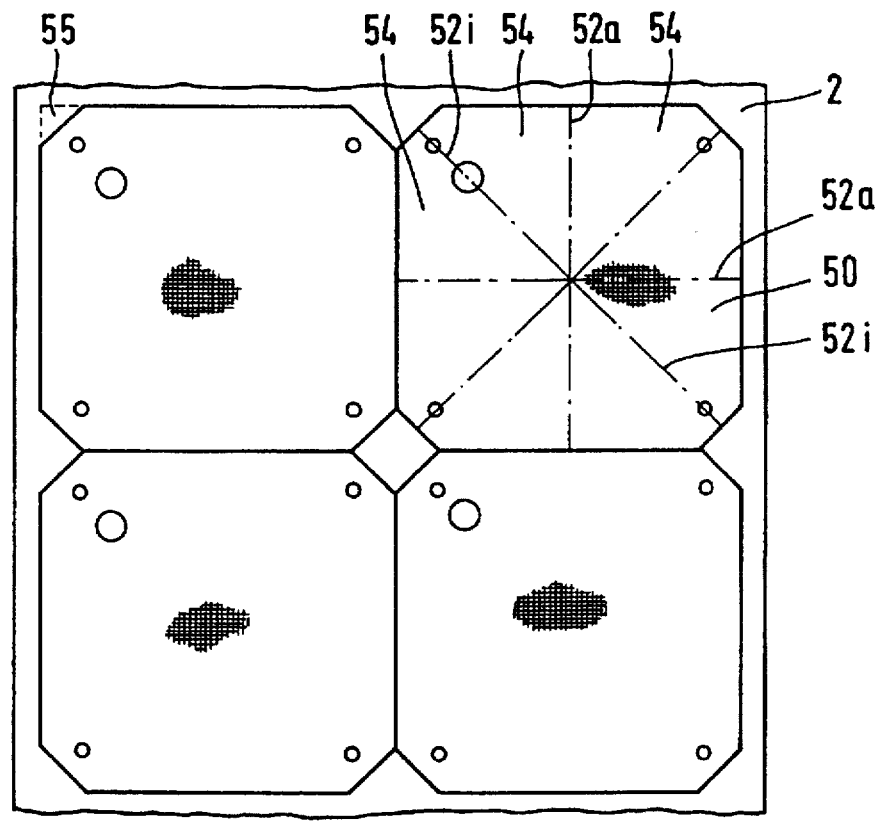
FIG. 5 illustrates a web having four cuttings of more or less square shape.

FIG. 1 illustrates a pear-shaped air bag 40 having its impact surface 18 to be faced to the front passenger and having its connecting opening 20 for a gas generator on the rear right. This air bag has an asymmetrical shape. Asymmetrical air bags can be better adapted to the internal structure of a vehicle, i.e. on the front passenger's side, the space between occupant, dashboard, windscreen and A-pillar (the pillar at the front, right alongside the windscreen). For producing this air bag a cutting 41, as shown perspectively in FIG. 2, is used.

The cutting has folding edges 42i1, 42a1, 42i', 42a2 and 42i2 which are arranged at acute angles to each other. Stitching edges 44 on both sides of the folding edge 42a1 are shaped the one mirror-inverse to the other. In the same way the stitching edges 46 on both sides of the folding edge 42a2 are shaped mirror-inverse to each other, but differently to those of the stitching edges 44.

Figure 11:
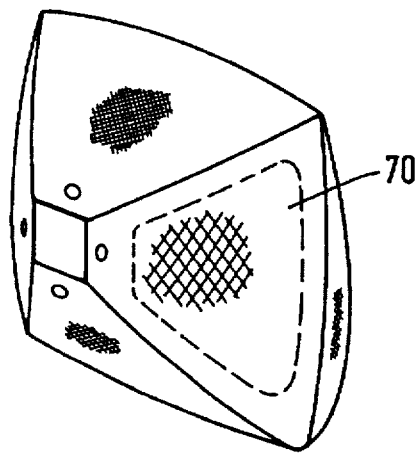
FIGS. 10 and 11 are side and perspective views respectively of the finished air bag.

By folding as shown in FIGS. 3 and 3a sections 47 are placed on mirror-inverse sections 47, i.e. sections have the same size but mirror-inverse in shape, whilst mirror-inverse sections 49 protrude upwards. Seams 45 are then produced along the edges to be stitched 44 and 46, so that the two sections 47 and the two sections 48 each are joined together. As mentioned above, instead of stitching, other methods of joining may be employed, e.g. fusing or bonding as applicable to textile material, this being especially significant, however, in the case that plastics films are used instead of textile material. The configuration thus formed this far is then folded as illustrated in FIG. 11, an inner folding edge 42i2 being produced between the sections 48 and 49. The two sections 49 are placed flat on each other and their stitching edges 44' are then stitched together (seams 53), but such that the connecting opening 20 remains free.

It is also possible to proceed vice-versa, i.e. to first fold as shown in FIG. 4 and produce the seams 53 before folding as shown in FIGS. 3 and 3a and producing the seams 45.

As shown in FIG. 5, cuttings 50 having the shape of squares with cut-off corners can be produced from a web, particularly the web of fabric 2. These cuttings receive inner folding edges 52i along their diagonals and outer folding edges 52a parallel to the edges of the square. All folding edges fully cover the width of the cutting, i.e. its full length, height or diagonals. By means of the folding edges sections 54 are formed which both as regards the folding edges 52i and also as regards the folding edges 52a are oriented mirror-inverse to each other. For other shapes it is sufficient when the sections are oriented mirror-inverse to each other e.g. by one outer folding edge on both sides, whilst having differing shapes on both sides of an inner folding edge. This results e.g. when instead of a square a rectangle is employed as the basic shape.

Figure 6:
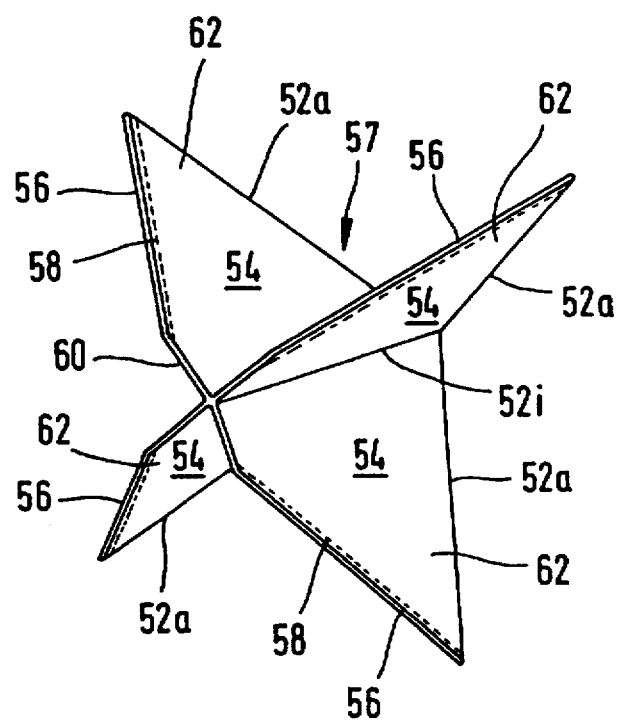
FIG. 6 is a perspective view of an umbrella-shaped configuration folded from one of these cuttings.
Figure 7:
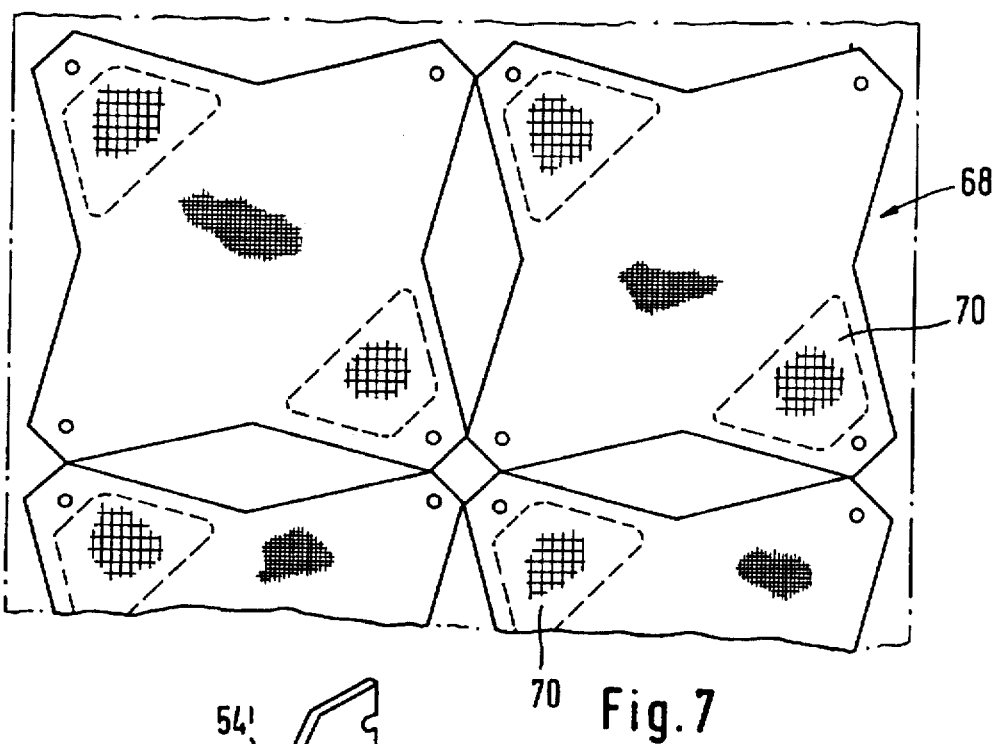
FIG. 7 illustrates a web having cuttings which as compared to a square have recessed side edges.

If cutting 50 is folded totally about all folding edges, a configuration results as illustrated in FIG. 6 in which it is shown in perspective in a symmetrical arrangement. Here, all outer folding edges 52a and one of the four inner folding edges 52i are to be seen, resulting in four stitching edges 56, at which the four seams 58 are produced one after the other. The cross-shaped configuration at the front left serves to form the connecting opening 60, which is not stitched and which results in the connecting opening for the gas generator at this location when the configuration is expanded.

The configuration as shown in FIG. 6 resembles that of a closed umbrella, the tip of which is located on the right (behind) and is thus termed "umbrella configuration". The ribs of the closed umbrella correspond to the inner folding edges 52i, whilst the outer folding edges 52a in the umbrella are formed by the parts of the material protruding outwards. In this umbrella configuration the stitching edges 56 are formed by the free edges of the material.

Figure 8:
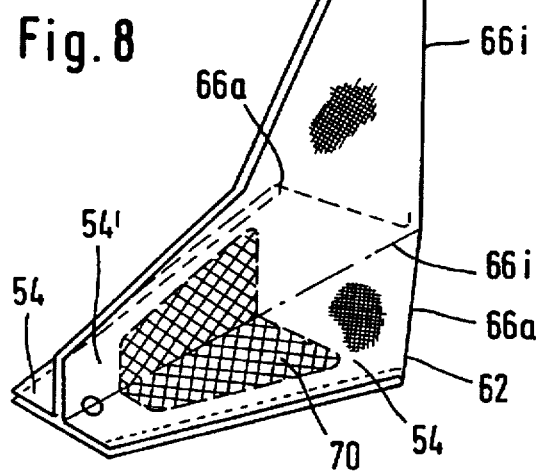
FIGS. 8 and 9 are perspective views of the cutting folded in other ways.
Figure 9:
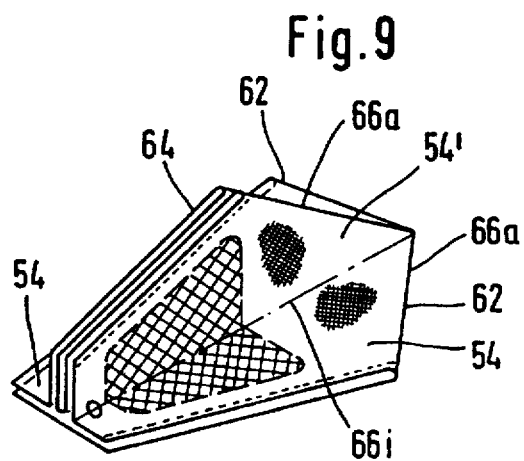

For stitching only one of the four wings 62 needs to be placed each time in a plane to produce the seam 58, before stitching one other of the four wings, and so on. FIG. 9 shows how two of the wings 62 need to be brought into a common plane for stitching, whilst the other two wings with sections 54' protrude upwards. FIG. 8 illustrates how yet another procedure is possible. Here too, two wings are located in a single plane for stitching, whilst the other two are still to be formed. In this situation, instead, the material still protrudes upwards unfolded. The folding edge 66i shown on the right in FIG. 8, which is actually an inner fold of the umbrella configuration, functions in that case temporarily as an outer folding edge; the same applying correspondingly to umbrella configurations having more than four wings.

Figure 10:
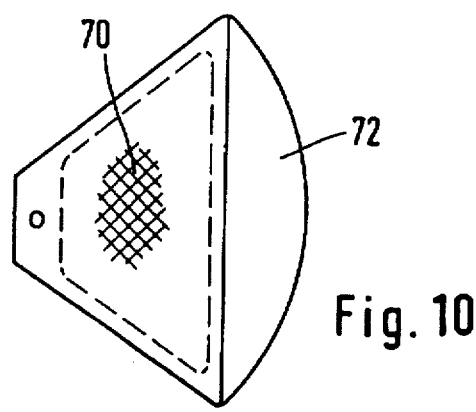

FIGS. 10 and 11 illustrate the finished air bag in a side view and in perspective respectively.

Whilst FIG. 6 illustrates an umbrella configuration having four wings 62, the stitching edges 56 of which are straight, umbrella configurations of a different kind may also be produced, e.g. having only three wings or five or more wings. The stitching edges 56 need not also be straight, but e.g. curved outwards, resulting in a larger cavity. Yet another variant is illustrated by FIGS. 7 to 11. Here, the side edges of the squares are recessed, truncated triangular pieces being lopped off, to produce an air bag as shown in FIGS. 10 and 11 which although smaller in volume, have a greater depth than an air bag as produced from a cutting as illustrated in FIG. 5.

Figure 12:
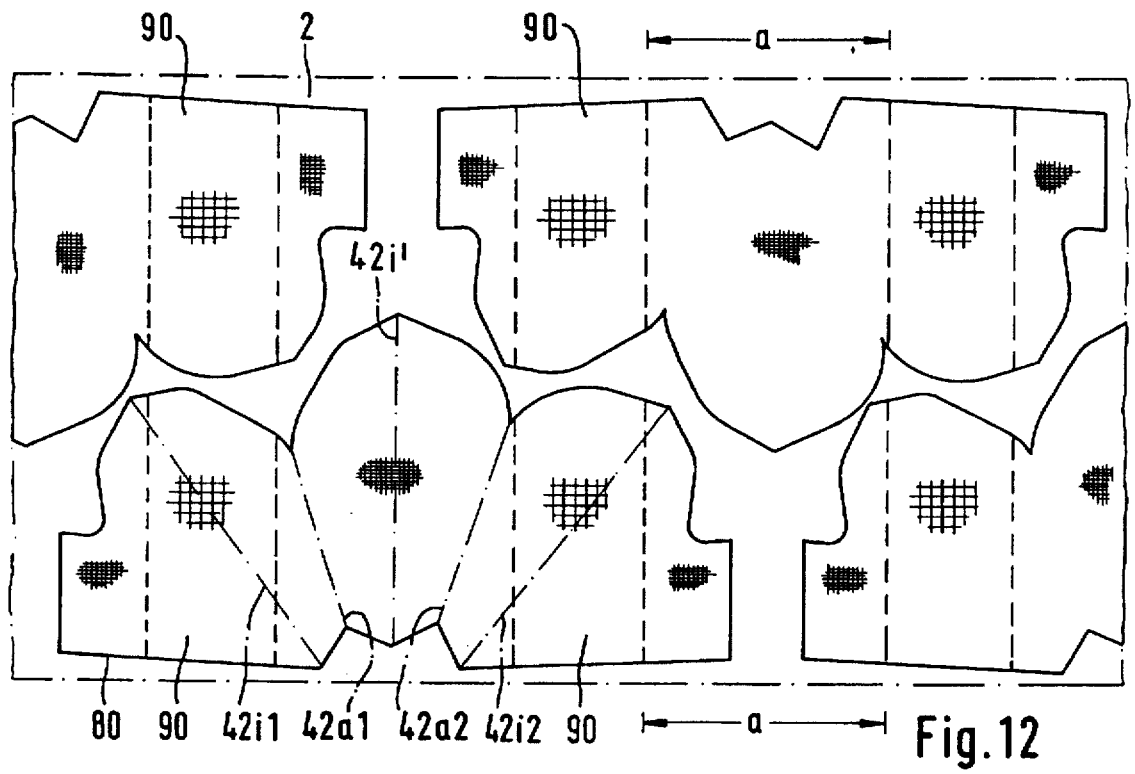
FIGS. 12 to 14 illustrate webs of fabric having cutting surfaces of the same shape nested in each other and having gas-permeable zones of differing shapes.

FIGS. 12 to 18 illustrate webs of fabric 2 having cuttings, all of which correspond to the cutting 41 as shown in FIG. 2. Only in FIG. 12 are the inner and outer folding edges 42i1, 42a1, 42i', 42a2, 42i2 indicated in one of these cuttings.

In all webs of the fabric gas-permeable zones are provided, which in the FIGS. are indicated lightly shaded, whilst the remaining components of the cuttings consist of a dense fabric, indicated densely cross-shaded in part. The dense fabric may be woven plain, the gas-permeable zones twilled.

Figure 13:
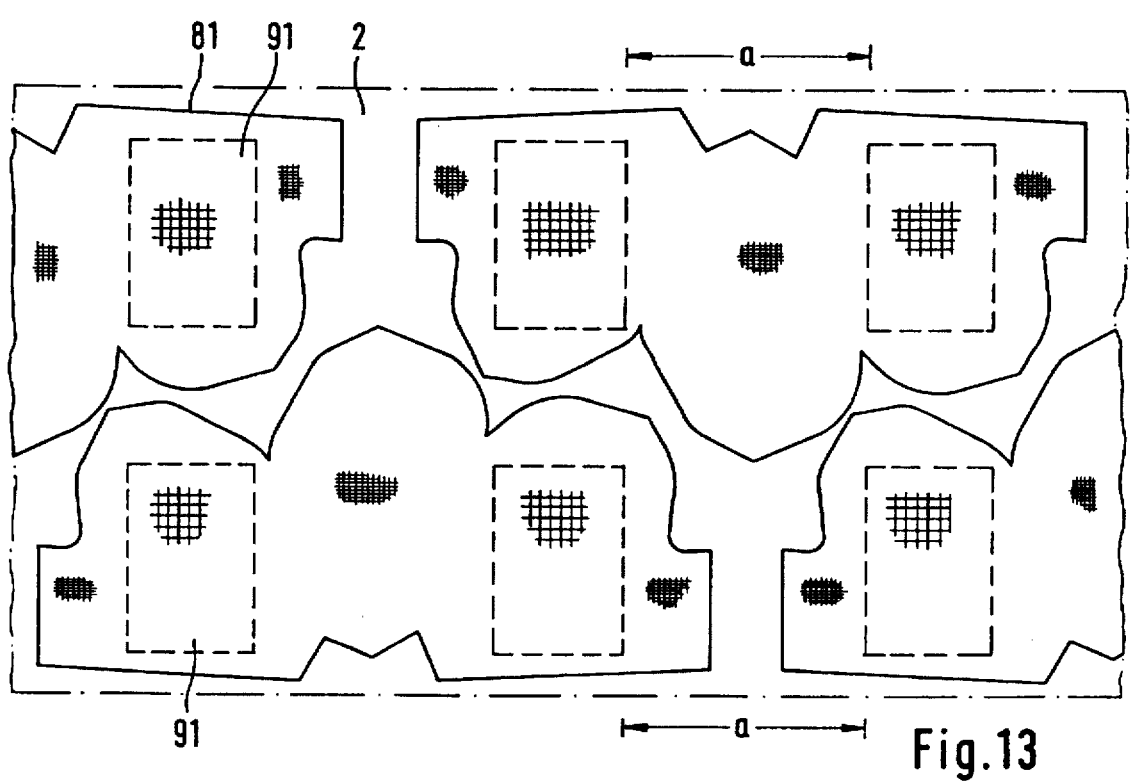
Figure 14:
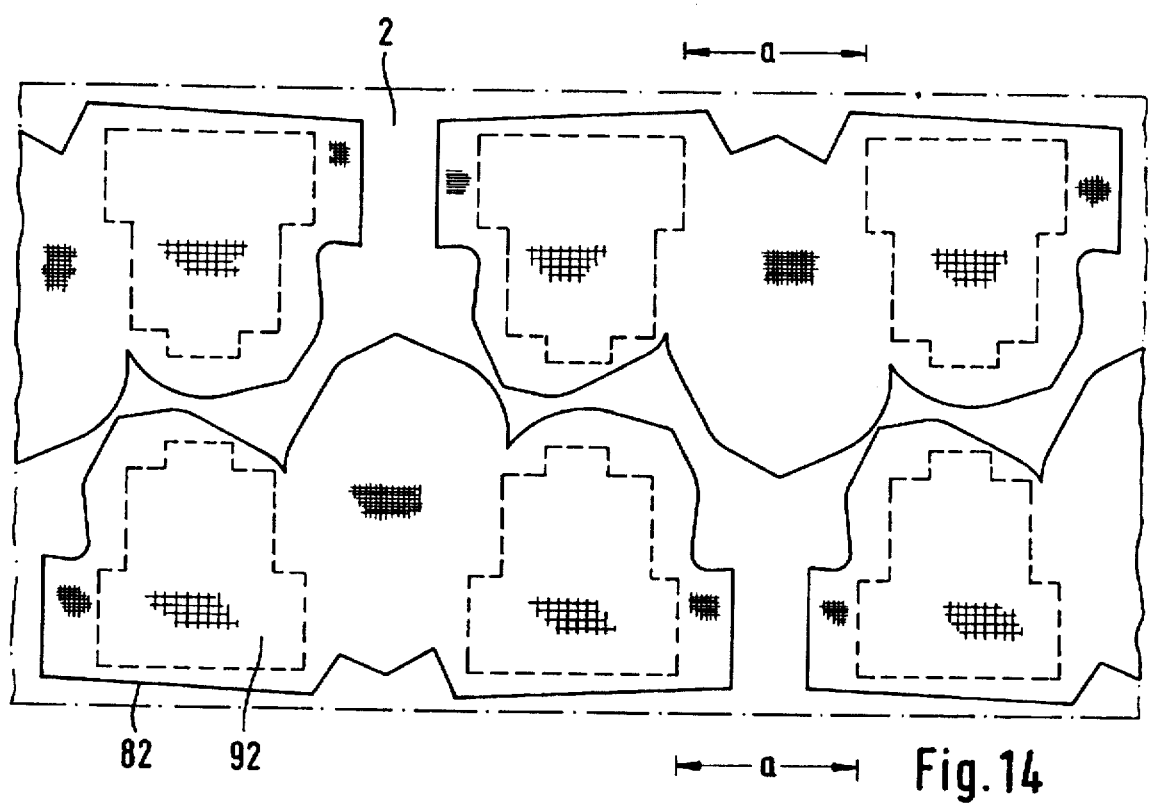

As illustrated in FIGS. 12 to 14 the surfaces of the cuttings 90, 91, 92 are arranged in two parallel rows within the web 2, i.e. nested so that the wastage resulting from cutting out is as little as possible.

FIG. 12 shows how gas-permeable strips 90 are provided which run over the full width of the web. By means of a shanked weaving machine it can be achieved that in the main part of the web a dense fabric, e.g. woven plain, whereas in the gas-permeable zones 90 a more permeable fabric, e.g. woven twilled, are produced. As is evident the gas-permeable zones in FIG. 12 agree with each other for the cutting surfaces arranged offset with respect to each other, i.e. they run in FIG. 12 from top to bottom, i.e. across the width of the web unchanged throughout.

One drawback in this arrangement is that stitching is needed in part in fabric which is less tough. This drawback is eliminated as shown in FIG. 13 by the gas-permeable zones 91 being arranged here within the cuttings 80 so that they fail to extend to the edges thereof, thus providing a tough fabric of adequate width for stitching.

As shown in FIG. 13 the gas-permeable zones are rectangular in shape, as can be produced with a shanked weaving machine. Here, it is important that, as illustrated in FIGS. 12, 13 and 14, equal spacings a within the cutting dictate the distance between two gas-permeable zones. The edges of the gas-permeable zones are also spaced by a from the one cutting to the other, as is evident from FIG. 12 to FIG. 14, thus resulting in simplified control of the shanked weaving machine.

FIG. 14 shows an arrangement similar to that of FIG. 13, in which however the gas-permeable zones 92 are better adapted to the shape of the cutting surface, thus enabling available space to be made better use of. Here too, the gas-permeable zone 92 can be produced with the aid of a shanked weaving machine, e.g. twilled.

FIGS. 15 to 18 illustrate a different arrangement. Here, the cutting 83 to 86 are arranged in sequence in the longitudinal direction of the web, i.e. space-saving as far as possible. The gas-permeable zones 93 in FIG. 15—similar to the situation in FIG. 14, are adapted as best possible to the shape of the cuttings and can be produced with the aid of a shanked weaving machine.

Figure 15:
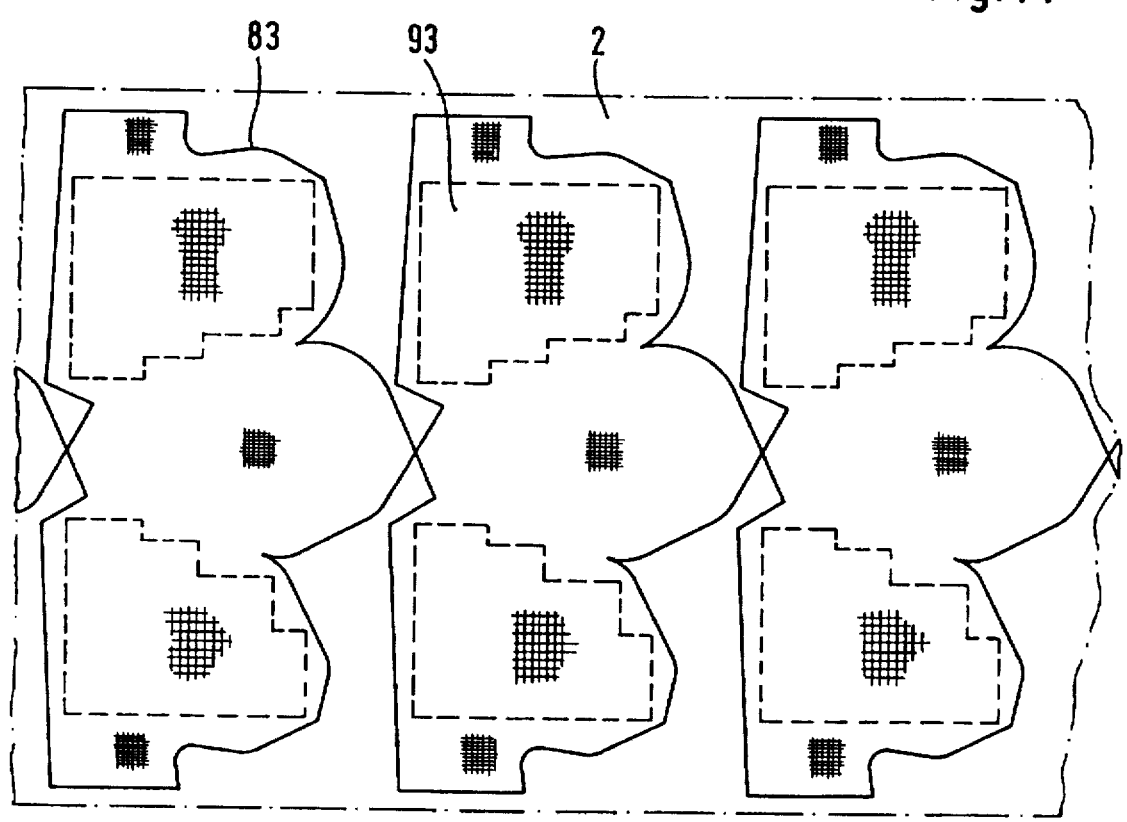
FIGS. 15 and 16 illustrate webs of fabric having cutting surfaces of the same shape in sequence and gas-permeable zones.
Figure 16:
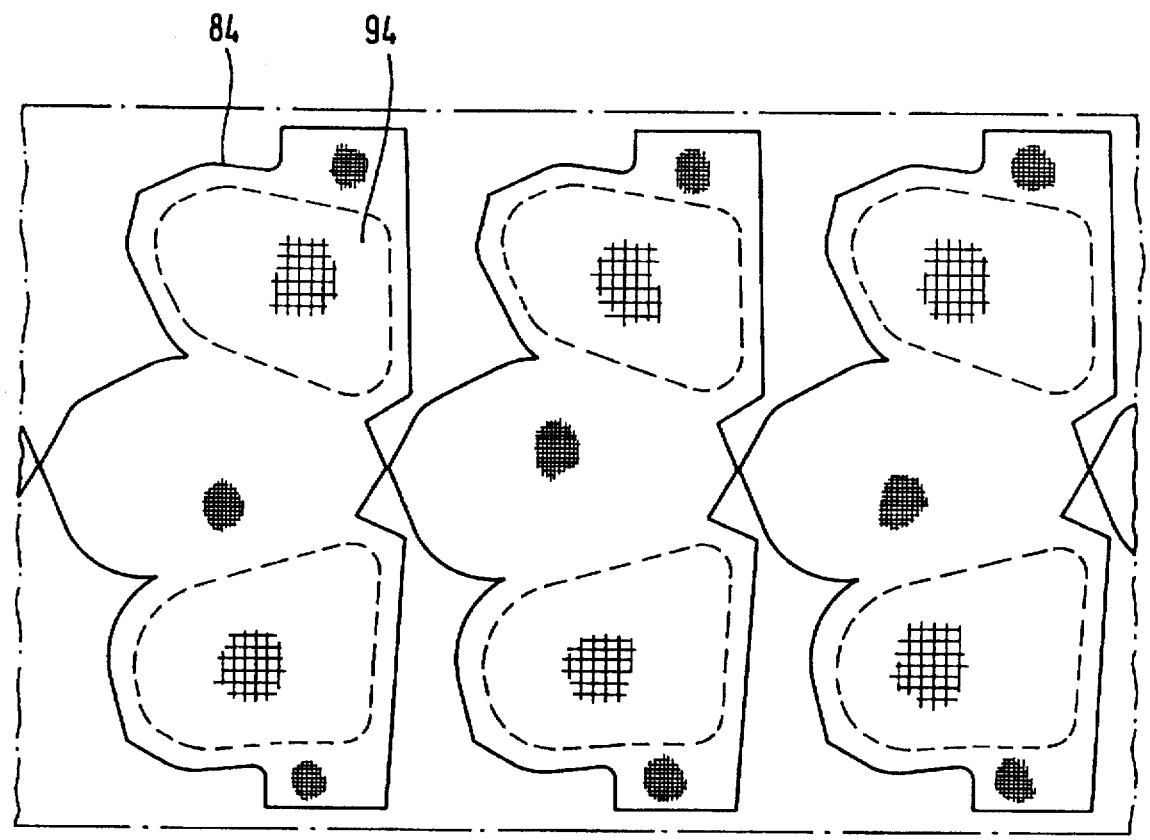

FIG. 16 shows the cutting surfaces 84, the shapes of which are adapted to the gas-permeable zones 94 even better possible. Here, however, a Jacquard device is needed, this having the advantage that the shape of the gas-permeable zones can be ideally adapted to the shape of the cuttings, but at the expense of having to employ a Jacquard device which is more expensive than a shanked machine. In addition, the weaving process takes longer than on a shanked machine, i.e. it needs to be investigated whether a zone shape as shown in FIG. 15 is more favorable in the end.

Figure 17:
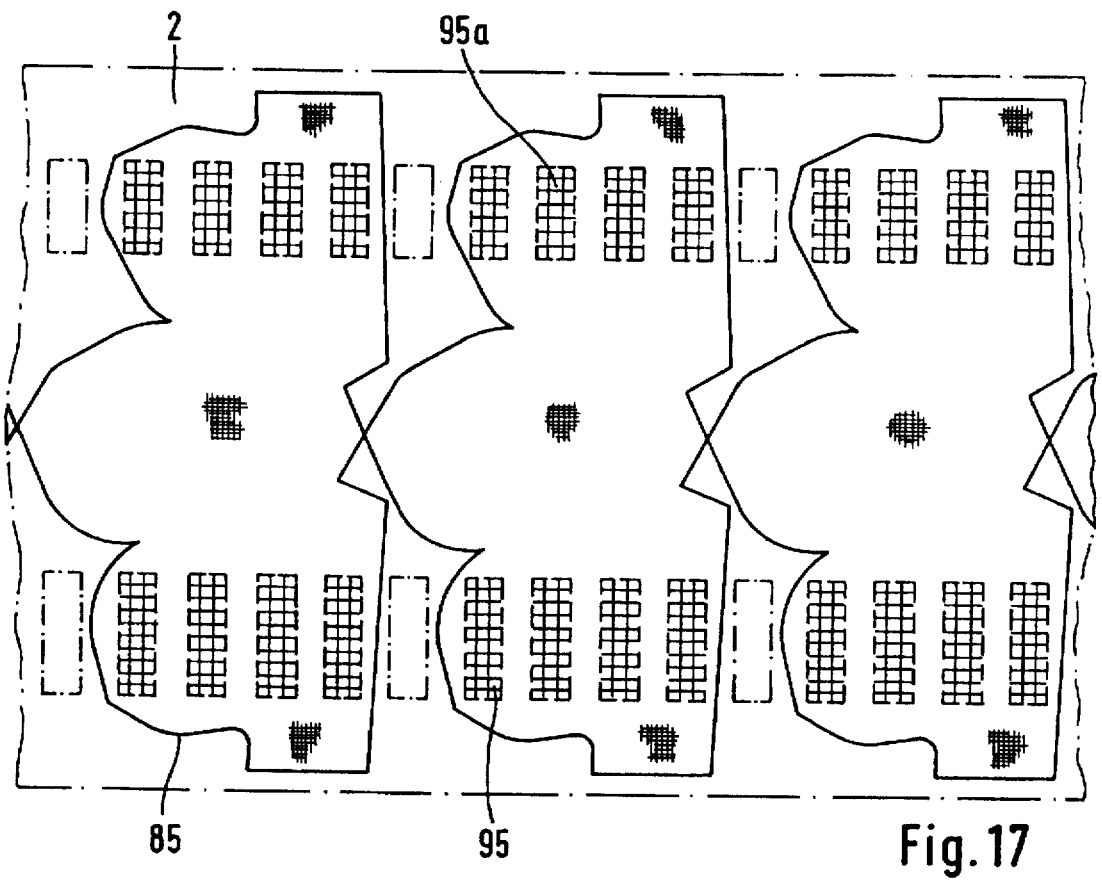
FIGS. 17 and 18 illustrate the same but with gas-permeable zones interspaced in the longitudinal direction of the webby spaces which are smaller than the register.

FIG. 17 shows a sequence of cutting surfaces 85 having gas-permeable zones 95 and 95a within a fabric web 2, i.e. a plurality of such gas-permeable zones 95 in the longitudinal direction of the web within a cutting in each case. Should a fabric flaw occur in an arrangement as shown in FIG. 15, a portion of the fabric web has to remain unused, namely as much as is needed by one of the cutting surfaces in the longitudinal direction of the web. In this case, for an arrangement as is illustrated in FIG. 12 to FIG. 14 a portion of the fabric web remains unused, corresponding to at least half the longitudinal direction of one of the cuttings. As shown in FIG. 17 only a minor portion of the fabric web needs to remain unused, i.e. corresponding to the shift by e.g. a spacing between two gas-permeable zones.

Figure 18:
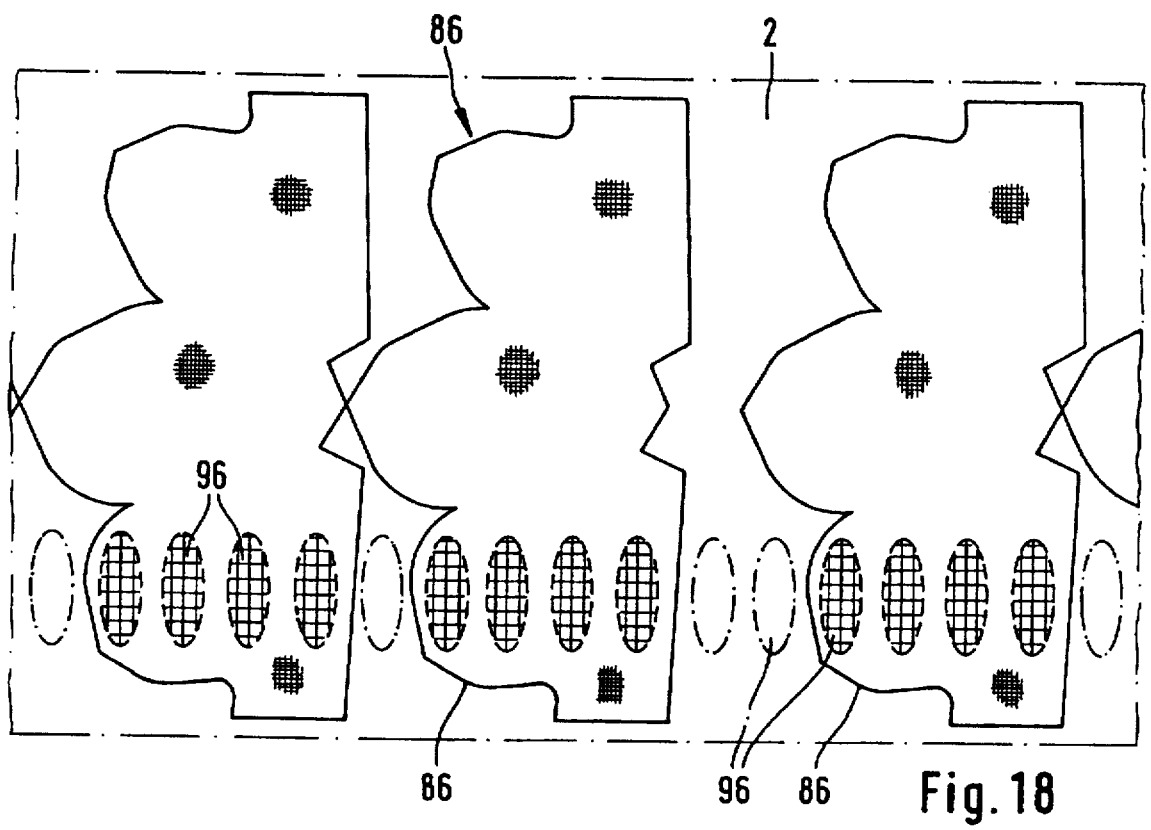

This situation is shown on the right in FIG. 18, where the right-hand cutting 86 had to be shifted, with respect to the middle cutting 86, merely by one of the gas-permeable zones 96. The degree of shift can be adapted to the degree of fabric flaw. Thus, due to an arrangement as shown in FIG. 17 or FIG. 18, the loss is little, should a fabric flaw occur.

The gas-permeable zones 95 can be produced with a shanked weaving machine, the gas-permeable zones 96 by means of a Jacquard device.

Air bags may also be produced of plastics film instead of textile fabrics, this being especially important in the case of newer gas generators emitting gases of lower temperature, thus avoiding the risk of the plastics film melting. Plastics films too, need to be equipped with gas-permeable zones. These zones are produced by stamping or by burning-in.

Cuttings of plastics film are preferably bonded or fused together.

| REFERENCE NUMERALS | |
|---|---|
| 2 | fabric web |
| 18 | impact surface |
| 20 | connecting opening |
| 40 | air bag |
| 41 | cutting |
| 42a1, 42a2 | outer folding edge |
| 42i1, 42i2, 42i' | inner folding edge |
| 45 | seam |
| 44,44',46 | edge (stitching edge) |
| 47,48,49 | section |
| 50 | cutting |
| 50a | outer folding edge |
| 52i | inner folding edge |
| 53 | seam |
| 54,54' | section |
| 55 | corner |
| 56 | edge (stitching edge) |
| 57 | umbrella configuration |
| 58 | seam |
| 60 | connecting opening |
| 62 | wing |
| 63 | connecting opening |
| 64 | edge (stitching edge) |
| 66a | outer folding edge |
| 66i | inner folding edge |
| 68 | cutting |
| 70 | gas-permeable zone |
| 72 | impact surface |
| 80 to 86 | cutting surface |
| 90 to 96 | gas-permeable zone |
| a | spacing |

We claim:

1. An air bag comprising:
   a) a single, one-piece cutting comprising textile material or plastics film,
   b) a plurality of sections of said cutting foldable about a plurality of inner and outer folding edges disposed in parallel planes closely juxtaposed,
   c) said folding edges fully encompassing the width of said cutting,
   d) a first and a second pair of said sections of said cutting being mirror-inverse about a first and a second of said plurality of outer folding edges, respectively, and having, after folding, joining edges in planes located one above the other for joining to each other,
   e) said inner folding edges and said outer folding edges alternating within said cutting,
   f) said juxtaposed folding edges covering acute angles with respect to each other;
   g) said first pair of said mirror inverse sections having stitching edges that are mirror inverse about said first outer folding edge and said second pair of said mirror inverse sections having stitching edges that are mirror inverse about said second outer folding edge; and
   h) two outermost sections of said cutting having mirror inverse stitching edges;
   wherein said air bag may be produced to any desired shape by altering the size and shape of said plurality of sections.

2. An air bag comprising:
   a) a single, one-piece cutting comprising textile material or plastics film,
   b) parts of said cutting being foldable about inner and outer folding edges in parallel planes closely juxtaposed,
   c) said folding edges fully encompassing the width of said cutting, d) two sections of said cutting being mirror-inverse about an outer folding edge and having, after folding, joining edges in planes located one above the other for joining to each other, e) said inner folding edges and said outer folding edges alternating, f) said sections having on both sides of said outer folding edges shapes which are mirror-inverse to each other, g) said sections on both sides of said inner folding edges also having shapes which are mirror-inverse to each other, and h) said juxtaposed folding edges covering acute angles with respect to each other such that said sections are adapted to be folded into a configuration of a closed umbrella.

3. The air bag as set forth in claim 2, characterized in that said cutting has essentially the shape of a square form the folding edges of which four being oriented parallel to diagonals and four further being oriented along middle straight lines oriented parallel to the edges extend.

4. The air bag as set forth in claim 3, characterized in that said cutting has recessed side edges to form a cavity of a depth greater than that obtainable by utilization of straight side edges.

5. A method of producing an air bag, said method comprising:

a) folding a cutting about inner and outer folding edges into a closed umbrella configuration, the inner folding edges corresponding to the ribs of said umbrella and a plurality of sections of the cutting being joined by the outer folding edges protruding outward, b) placing two of said sections neighboring an outer folding edge flat on each other and, c) joining together the free edges of the sections.

6. A method of producing an air bag as set forth in claim 5, characterized in that, a) prior to said joining the free edges of the two sections, said cutting not yet being fully folded to form the umbrella configuration, b) arranging four juxtaposed sections located between two inner folding edges in two planes closely located the one on the other, c) joining the edges of the four sections to each other, whilst all remaining sections protrude crosswise and are oriented essentially parallel to each other, and d) joining the edges of said crosswise protruding sections.

7. The air bag as set forth in any of the claims 1 to 4, characterized in that, a) a material web from which the cutting is to be cut out for the air bags, has gas-permeable zones comprising a material which is more permeable to gas than the remainder of the web, b) said zones are arranged in the said material web such that they are located in the finished air bag at positions outside of the impact surface to be faced to the occupant, and c) each gas-permeable zone has the shape of a strip oriented in the longitudinal or transverse direction of said material web.

8. The air bag as set forth in any of the claims 1 to 4, characterized in that, a) a material web from which the cutting is to be cut out for the air bag has gas-permeable zones comprising a material which is more permeable to gas than the remainder of the material web, b) said zones are arranged in the said material web such that they are located in the finished air bag at positions outside of the impact surface to be faced to the occupant, c) two or three rows of nested cutting surfaces are accommodated in parallel to each other in the longitudinal direction of the material web, and d) the zones of all said rows are arranged mirror-inversely to each other on both sides of the longitudinal axes of the material web.

9. The air bag as set forth in claim 7, characterized in that said zones are equispaced within a cutting surface and between two cutting surfaces in the longitudinal direction of the material web.

10. The air bag as set forth in claim 8, characterized in that, a) said material web has in its longitudinal direction equal zones in sequence of which more than one is to be accommodated within a cutting surface so that between the edges of said zones and the edges of said cutting surfaces a safety margin remains, and b) even in the case of a partial repeat advance zones are accommodated in the provided number and arrangement whilst keeping to the safety margins within the cutting surface.

11. The air bag as set forth in claim 7, a) said material web comprises a textile fabric, b) a major portion of said material web having a dense weave, and c) said gas-permeable zones having a less dense weave than said major portion of said material web.

12. The air bag as set forth in claim 7, characterized in that a) said material web comprises a plastics film and b) holes are stamped out to form said zones.

13. The air bag as set forth in claim 12, characterized in that said plastics film is reinforced by plastic threads.

14. The air bag as set forth in claim 7, characterized in that a) said material web comprises a plastics film and b) holes are burnt out to form said zones.

15. The air bag as set forth in claim 12, characterized in that said plastics film is reinforced by glass fibers.

* * * * *